United States Patent Office 3,708,366
Patented Jan. 2, 1973

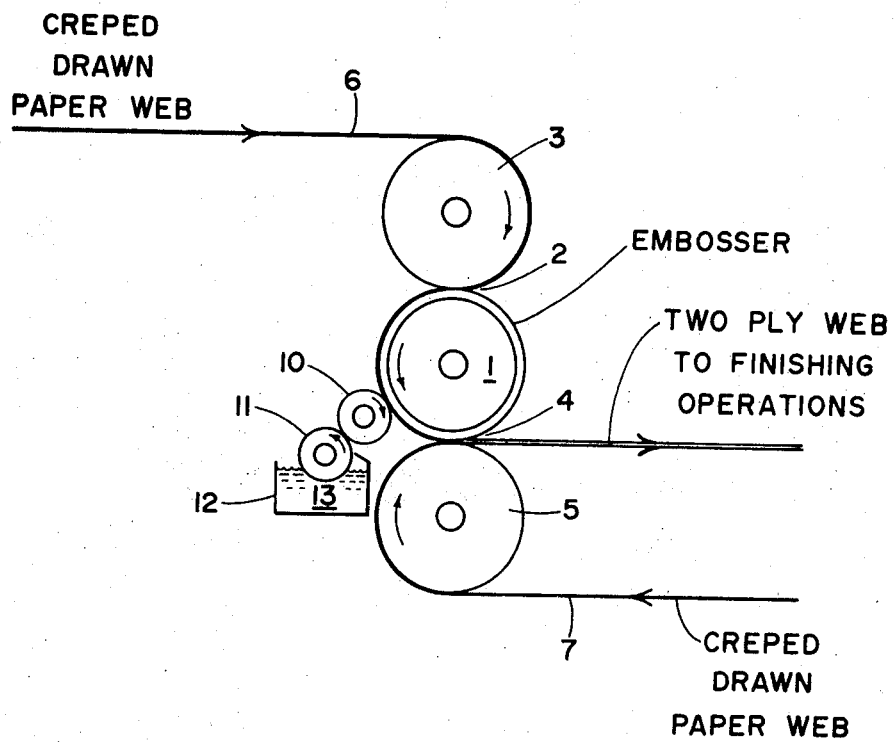
FIG. I
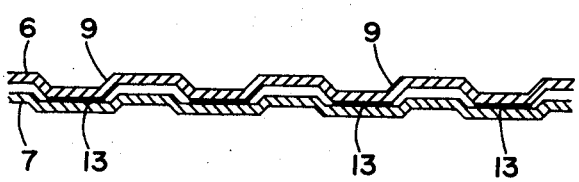
FIG. 2
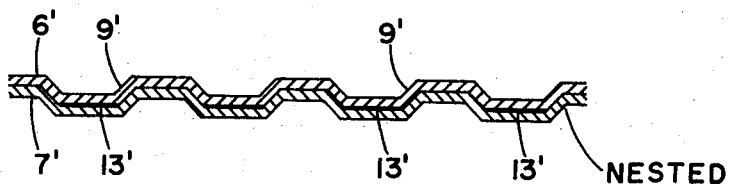
FIG. 3

3,708,366
METHOD OF PRODUCING ABSORBENT PAPER TOWELING MATERIAL
Harold F. Donnelly, Appleton, Wis., assignor to Kimberly-Clark Corporation, Neenah, Wis.
Original application Nov. 9, 1967, Ser. No. 681,858. Divided and this application Nov. 25, 1970, Ser. No. 92,569
Int. Cl. B31f *1/00;* B32b *3/30*
U.S. Cl. 156—209                                                2 Claims

ABSTRACT OF THE DISCLOSURE

A multi-ply and two-sided paper toweling in which one ply is more severely embossed than other, the plies being preferably adhesively attached to facilitate cutting, assembling and the like without ply separation. The toweling has one relatively rough and one relatively smooth outer side. A first toweling ply having the smooth outer side is embossed in successive rolling pressure nips and adhesive may be applied to embossment peaks between pressure nips; the second toweling ply having the more roughened outer side is preferably embossed and simultaneously adhesively united with the first ply in the second of the embossing nips. The latter of the embossing nips is preferably, although not necessarily, a lower pressure nip than is the first, usually just sufficient to secure adhesion. Such nip may be formed by the cooperation of a steel configurated roll with a backing roll of resilient material such as rubber or a fine bristle brush.

This application is a divisional application of my co-pending application Ser. No. 681,858 filed Nov. 9, 1967, now abandoned.

BACKGROUND OF THE INVENTION (1) Field of the invention

This invention relates to paper toweling and is particularly concerned with multi-ply two-sided toweling and to economical methods and apparatus for production of the same.

(2) The invention with relation to the prior art

Paper toweling of one or multiple plies has been marketed for many years. The known towels vary in basic physical structural characteristics such as ply construction, basic weight, limpness, stretchability, surface texture and the like. One well-known toweling is two-sided, that is, has its oppositely disposed sides of different degrees of smoothness; such a product has been produced by the embossing of two plies in a single pressure nip, the extent of embossing being sufficient to adhere the plies without adhesive and effective to provide a limp towel. A limp towel structure is advantageous in cleaning operations where entry to corners, narrow spaces or the like is desirable.

Towels having the two outer sides smooth are known and taught in U.S. Pat. 1,964,700, for example; the toweling plies employed in such structure are webs which may be successively creped, embossed and united with their rough sides confronting to cause voids or air spaces between the plies. The smooth outer sides present a smooth feel and large effective area to the skin of a user while the internal air spaces limit the rate of liquid transfer between plies and inhibit towel disintegration upon towel wetting. The tendency of multi-ply toweling to separate in use or in cutting, etc., is recognized in U.S. Pat. 1,961,914 and provision made for adhesively uniting the plies merely locally or at their edges. U.S. Pat. 1,786,781 teaches the provision of an adhesive in toweling, which adhesive is water adsorptive, thus avoiding the objection to some adhesives that they tend to reduce the towel capacity for drying. Adhesive application between plies may take many forms such as the adhesive dots of Pat. 1,786,781 or the application employed in heavy embossing actions such as illustrated in U.S. Pat. 2,978,006, for example. Alternatively, the adhesive may be applied as a size along compressed lines in the toweling to thereby strengthen the towel around absorbent towel areas created by passing the material through rolls having small pockets as set out in U.S. Pat. 1,033,992 or as shown in U.S. Pat. 1,900,257. While my procedure employs principles set out above, it differs largely in that embossing actions take place in successive nips with one ply being subjected to plural embossings and the second to only one such action. By this means I limit the mechanical pressing action on one toweling ply as desired, thereby controlling its absorbency; also, the mechanical arrangement may be simplified to a single stack of rolls embodying embossing and back-up rolls and occupying a minium of space. The product itself may include adhesive applied only in controlled areas and amounts, and, if desired, the embossing action alone may be relied upon for ply adhesion. I contemplate operating speeds for the toweling production to be equal to most toweling production operations and to exceed many as, for example, where ply registration of embossments is a factor.

The invention will be more fully understood by reference to the following detailed description and accompanying drawings wherein:

FIG. 1 is a schematic view with web travels illustrated of an apparatus arrangement for producing a towel in accordance with the invention;

FIG. 2 is a drawing in side view, greatly exaggerated, of toweling material in accordance with the invention;

FIG. 3 is a drawing of toweling material similar to that of FIG. 2 but wherein the embossing action is more severe.

Referring to the drawings, the numeral 1 in FIG. 1 designates a hard, substantially unyielding male embosser roll, suitably of steel. Roll 1 forms a first pressure nip 2 with rubber covered roll 3. The rubber covering of roll 3 has a Shore Durometer A of about 25 to 40 and is considered in the embossing art to be quite soft. Roll 1 forms a second pressure nip 4 with rubber covered roll 5; roll 5 has about the same softness as roll 3, that is, a Shore Durometer A of about 25 to 40. Within the range of 25 to 40 Durometer, the rolls need not match but I prefer that roll 5 be as soft or softer than roll 3. Also, the nip 4 is such that less pressure is exerted on material passing therethrough than is the case of nip 2. Consequently, in nip 2 a greater mechanical action is commonly exerted on web materials in the practice of the invention. Accordingly, a web will be more severely acted upon in nip 2 and will, in many instances, not be significantly affected by the succeeding nip 4.

Roll 1 is independently driven in conventional manner, and rolls 3, 5 are driven by roll 1 through friction contact. This arrangement provides that no substantial stress is exerted on webs passing through the pressure nip due to speed variations. Either of the other of the rolls 3, 5 might serve as the driving roll. Such mechanism is known, forms no part of the present invention and is, therefore, not described in detail.

In the production of toweling a first web 6 is directed to nip 2 over rubber covered backing roll 3. This web, like the web 7 (FIG. 1), is preferably formed of a chemical type wood pulp such as sulfite pulp or kraft pulp; groundwood may be employed as a portion of the furnish in some instances but tends to be less sorptive and to cause a degree of linting in the final product. The cellulosic pulp webs suitably contain a wet strength agent of conventional nature (so that the wet strength is 30 to 40% of dry strength), are creped (crepe ratio of 1.5:1 to 3:1) and each web may have a weight of between about 10 and 16 pounds per 2880 sq. ft.; commonly, weights of 12 to 14 pounds per 2880 sq. ft. are preferred. Importantly, in the practice of this invention the webs have a stretch characteristic due to crepe structure of about 20–35% of their original length, as fed to the embosser. Selection of the specific stretch range varies with the depth and configuration of the embossing pattern selected for use, a more stretchy sheet being desirable as the embossing depth increases. In any event, the stretch must be sufficient to provide for embossing without rupture. Generally, the webs provided in any given toweling material are of about the same characteristics as a single source of web material may then be employed, and only one web material need be stocked.

The web 6 is fed over rotating roll 3 to the nip 2. Such web at a basis weight of about 11–16 lbs./2880 ft.$^2$ finished has an apparent thickness of about 0.003–0.005 inch. In the nip 2 the male protuberances of roll 1 cause the roll 3 to be indented by the web in known manner and the web to be mechanically worked so that it acquires embossments 9. These embossments are projections from the surface of the web 6 and are effected generally by localized stretching of the web between the rolls and on the protuberances of the rolls. The rubber covered roll, due to its softness, will tend to fill in spaces between protuberances of the embossing roll and to carry the web into such spaces accentuating slightly the effect of the embossments of the paper web. While the embossments may be of many differing contours, a preferred and simple shape is that of a frustum of a cone in which the embossments have a height of about 0.035–0.050 inch and have a peak diameter of about $\frac{1}{32}$ to $\frac{1}{16}$ inch; also, the embossments are preferably about $\frac{1}{8}''$ apart on centers.

The embossed web 6 in the practice of the invention is carried on the embossing roll 1 without removal to the nip 4. The web may, if desired in the course of travel to the nip 4, be supplied with an adhesive.

For the purpose of applying adhesive to traveling web 6, an applicator roll 10 is provided in light kiss contact with the web on the embossing roll. Smooth applicator roll 11 is mounted in pond retainer 12 and an adhesive body 13 forms the fluid pond for adhesive application to the web. The application is such that smooth roll 10 applies adhesive to the web on each protuberance of the male roll across the apparatus width.

The adhesive, when employed, is preferably applied as indicated in small discrete amounts to avoid final product stiffening. Any of a number of adhesives are useful such as polyvinyl acetate emulsions, aqueous solutions of polyvinyl alcohol, synthetic latices and the like. Preferably, in the present instance, they are somewhat viscous and quick drying to limit web penetration and assure rapid development of bonding.

Web 7 is fed to nip 4 on rotating soft rubber covered roll 5. Web 7 is urged into contact with web 6 and web 7 tends to conform to the configuration of web 6 due to the application of some pressure in nip 4. This pressure should be sufficient to unite the webs either with the aid of the adhesive or in the absence of it. In the absence of adhesive the web adhesive is quite low with webs having a normal moisture content of 5–7%. Webs having a stabilized moisture content of about 20% would have more adhesion though generally less than that afforded by the usual adhesive.

In the presence of adhesive in discrete areas of web 6, corresponding to web projections, the pressure applied in nip 4 may be relatively light but is nevertheless, in the practice of the invention, sufficient to cause a degree of nesting of the embossments of web 6 in the web 7 (FIG. 2). With somewhat higher pressures the adhesive application may be more limited and the soft drapable and extensible web 7 may conform closely to the contour of web 6 on the embosser roll (FIG. 3).

The multiply web, as it is withdrawn from nip 4, is subjected to finishing operations including any adhesive drying which may be necessary, winding, cutting, folding, assembling, packing and the like, or the composite sheet may simply be directed to conventional winder mechanism for formation into a roll.

The product illustrated in FIG. 2 is formed with adhesive as set forth above. In the line drawing (FIG. 2) the web designated at 6 is the more severely embossed of the webs 6, 7. Web 7 is retained by adhesive 13 in contact with web 6 and the two webs are slightly nested, adhesive being present only in the apex portions of the embossments. The adhesive in this instance primarily retains the two webs together. Although web 7 less heavily embossed than web 6, it nevertheless, is more rough to the touch as embossments 9 cause protrusions on the outer lower side (FIG. 2). In contrast, the upper surface of the web (FIG. 2) has depressions only and such surface presents a smooth feel to a towel user.

The drawing of FIG. 3 illustrates a structure in which web 6' is embossed similarly to web 6 but web 7' is more heavily embossed so that nesting of the webs takes place to a much greater degree. In this instance the embossment 9' receives the web 7' to substantially the depth of embossment 9', and adhesion 13' is applied more thinly.

While rubber covered rolls have been described as the useful back-up rolls for embosser 1, closely packed, stiff bristle brushes may be substituted for the rolls 3, 5. Such bristle brushes provide, in general, a less sharp embossing pattern on toweling but also provide for opening of the webs and increasing web absorbency.

As many apparently widely different embodiments of this invention may be made without departing from the spirit and scope thereof, it is to be understood that I do not limit myself to the specific embodiments thereof except as defined in the appended claims.

What is claimed is:

1. In the production of absorbent paper toweling material of cellulosic wood pulp fibers to provide a bulky, limp and laminated two-sided product wherein opposed plies of the toweling material are creped and drawn to render them soft, drapable and extensible and each ply is sufficiently stretchy and of low density to conform to embossing patterns without rupturing, the process improvement which comprises embossing a first one of the webs in a pressure nip formed between a hard, substantially unyielding male embosser roll and a first soft impression roll to provide projections on one side and depressions on the other side of the web, carrying the web without removal from the male embosser roll to a second pressure nip having a lower pressure than the first one of said pressure nips and formed between the male embosser roll and a second soft impression roll, directing the second of the webs into the second nip by carrying it on the second soft impression roll so that projections of the first web intimately engage the second web, tend to cause nesting of the first web into the second web and whereby adherence of the webs is greater at the extremities of the protuberances of the first web, and withdrawing the webs as a unitary toweling sheet material from the second nip.

2. The process according to claim 1 in which the webs each have a wet strength which is about 30 to about 40% of dry strength, have a basis weight of about 10 to 16 pounds per 2880 sq. ft. and as directed to the embosser have a stretch characteristic due to their crepe structure of about 20 to 35% based on the length fed to the embosser.

References Cited

UNITED STATES PATENTS

| 2,043,351 | 6/1936 | Fourness et al. | 161—129 |
| 3,547,723 | 12/1970 | Gresham | 156—209 |
| 3,399,101 | 8/1968 | Magid | 156—219 XR |
| 2,950,223 | 8/1960 | Bletzinger et al. | 161—73 XR |
| 3,414,459 | 12/1968 | Wells | 156—209 XR |
| 3,466,212 | 9/1969 | Clayton et al. | 161—131 XR |

WILLIAM A. POWELL, Primary Examiner

U.S. Cl. X.R.

156—210, 219, 291; 161—127, 129, 130, 148